United States Patent
Hessling et al.

(10) Patent No.: US 8,974,097 B2
(45) Date of Patent: Mar. 10, 2015

(54) METHOD FOR CONTROLLING AN AIRCRAFT LIGHT

(71) Applicant: Goodrich Lighting Systems GmbH, Lippstadt (DE)

(72) Inventors: Andre Hessling, Koblenz (DE); Robert Trinscheck, Hamm (DE); Siegfried Schmees, Geseke (DE); Mike Herberhold, Warstein (DE); Stefan Thomassin, Lippstadt (DE)

(73) Assignee: Goodrich Lighting Systems GmbH (DE)

( * ) Notice: Subject to any disclaimer, the term of this patent is extended or adjusted under 35 U.S.C. 154(b) by 203 days.

(21) Appl. No.: 13/644,380

(22) Filed: Oct. 4, 2012

(65) Prior Publication Data
US 2013/0088148 A1 Apr. 11, 2013

(30) Foreign Application Priority Data
Oct. 7, 2011 (EP) .................................. 11184329

(51) Int. Cl.
*H05B 33/08* (2006.01)

(52) U.S. Cl.
CPC ................................. *H05B 33/0854* (2013.01)
USPC .............. 362/470; 362/545; 315/77; 315/309

(58) Field of Classification Search
CPC ............. B06Q 11/005; H05B 37/0218; H05B 33/0854
USPC .......... 315/76–77, 307, 309; 362/45–46, 470, 362/543–545
See application file for complete search history.

(56) References Cited

U.S. PATENT DOCUMENTS

| | | | |
|---|---|---|---|
| 4,182,977 A | 1/1980 | Stricklin, Jr. | |
| 6,191,541 B1* | 2/2001 | Patel et al. | 315/307 |
| 6,236,331 B1 | 5/2001 | Dussureault | |
| 8,232,745 B2* | 7/2012 | Chemel et al. | 315/308 |
| 8,531,134 B2* | 9/2013 | Chemel et al. | 315/308 |
| 2006/0146553 A1* | 7/2006 | Zeng et al. | 362/488 |
| 2008/0238343 A1 | 10/2008 | Hargenrader et al. | |
| 2008/0273331 A1* | 11/2008 | Moss et al. | 362/294 |
| 2009/0021181 A1 | 1/2009 | Brune | |
| 2010/0052542 A1* | 3/2010 | Siemiet et al. | 315/129 |
| 2010/0308748 A1 | 12/2010 | Sulaiman et al. | |
| 2011/0080116 A1* | 4/2011 | Negley et al. | 315/297 |
| 2011/0241568 A1* | 10/2011 | Zlotnikov et al. | 315/297 |
| 2012/0068600 A1* | 3/2012 | Hartmann et al. | 315/51 |

FOREIGN PATENT DOCUMENTS

| | | |
|---|---|---|
| DE | 19754222 A1 | 6/1999 |
| DE | 19917239 A1 | 10/2000 |

(Continued)

*Primary Examiner* — Jason M Crawford
(74) *Attorney, Agent, or Firm* — Cantor Colburn LLP

(57) ABSTRACT

A method for controlling an aircraft having a plurality of LEDs, light so as to emit a desired light intensity includes the steps of providing a reference LED located within or outside of the aircraft light, providing thermal conditions resulting in a thermal stress for the reference LED similar to the maximum thermal stress, and observing the reference LED by means of an optical sensor for monitoring the optical aging behavior of the reference LED throughout its lifetime. The desired light intensity of the aircraft light is achieved by controlling the plurality of LEDs in accordance with the monitored aging behavior of the reference LED.

9 Claims, 1 Drawing Sheet

(56) References Cited

FOREIGN PATENT DOCUMENTS

| | | |
|---|---|---|
| DE | 10201908 C1 | 7/2003 |
| DE | 10257184 A1 | 7/2003 |
| DE | 10248238 A1 | 4/2004 |
| DE | 102004060201 A1 | 6/2006 |
| DE | 102005018175 A1 | 10/2006 |
| DE | 202007005003 | 7/2007 |
| DE | 102006054512 A1 | 5/2008 |
| DE | 102009006250 A1 | 10/2009 |
| DE | 102008020382 A1 | 11/2009 |
| DE | 102008064397 A1 | 6/2010 |
| DE | 102009031403 A1 | 1/2011 |
| EP | 1825188 A1 | 8/2007 |
| WO | 9609667 A1 | 3/1996 |
| WO | 9956303 A1 | 11/1999 |
| WO | 0171444 A1 | 9/2001 |
| WO | 2006063552 A1 | 6/2006 |
| WO | 2008104228 A1 | 9/2008 |
| WO | 2010036789 A1 | 4/2010 |
| WO | 2010139059 A1 | 12/2010 |

\* cited by examiner

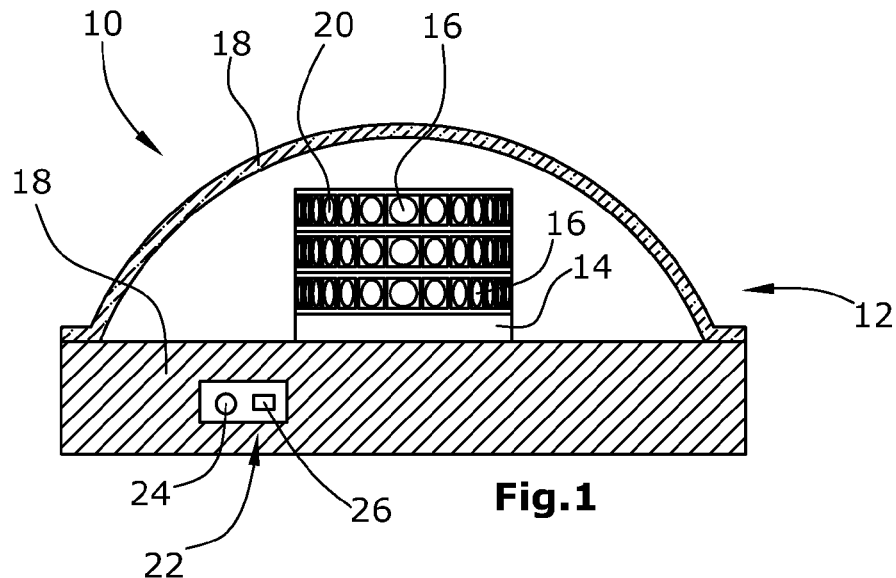
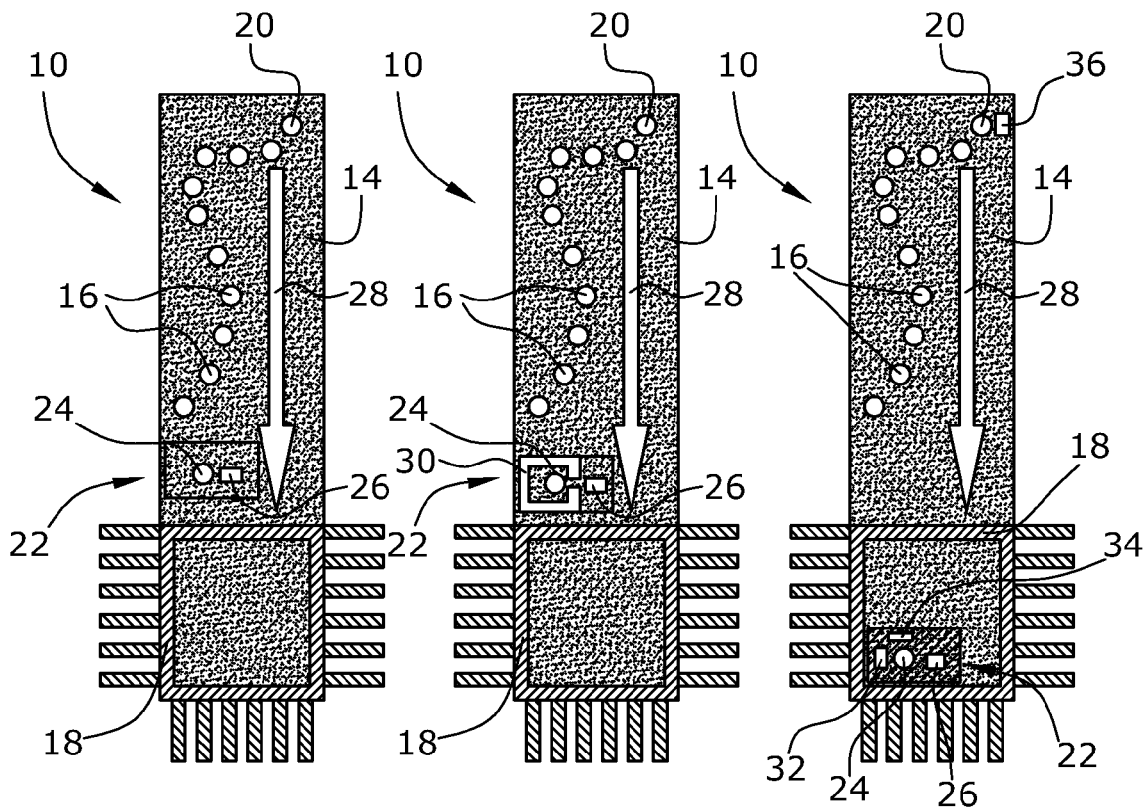

METHOD FOR CONTROLLING AN AIRCRAFT LIGHT

BACKGROUND OF THE INVENTION

1. Field of the Invention

The present invention relates to a method for controlling an aircraft light so as to emit a desired light intensity taking into consideration the aging behavior of the LED light sources of the aircraft light and compensating for the aging effect of the LEDs.

2. Description of the Prior Art

In the field of interior and exterior aircraft lights, during the last decades more and more LEDs are used as light sources. As in case of electronic components in general as well as in case of other electro-optical components, LEDs are subjected to aging. This results in a reduced intensity of the light emitted by the LEDs throughout their lifetime which can be compensated by increasing the power supply to the LEDs.

It is known in the art to sense the aging degradation of LEDs by means of sensors detecting the light intensity emitted by an LED. Examples of these designs can be found in EP-B-1 825 188, DE-A-102 48 238, DE-B-102 57 184, DE-A-197 54 222, DE-A-10 2008 020 382, DE-A-10 2009 006 250, WO-A-99/56303, WO-A-2008/104228, and U.S. Pat. No. 6,236,331.

It is also known in the prior art to compensate for any aging degradation of LEDs. Examples of lights using this compensation concept can be found in DE-A-199 17 239, DE-C-102 01 908, DE-A-10 2004 060 201, DE-A-10 2005 018 175, DE-A-10 2006 054 512, DE-A-10 2008 064 397, DE-A-10 2009 031 403, WO-A-96/09667, WO-A-01/71444, and U.S. Pat. No. 4,182,977.

When compensating for aging degradations of LEDs, one has to sense the light intensity of an LED throughout its lifetime. The aging degradation is dominated in the first place by the temperature of the LED, i.e. the environmental temperature and/or the operational temperature of the LED. For sensing the light intensity, an optical sensor is necessary. However, depending on the aircraft light design, it can be difficult to place an optical sensor within the housing of the aircraft light due to limited space and/or due to the fact that the optical sensor might cause shielding effects and a reduced light yield because the light of an LED impinging on the optical sensor can no longer be used for the illumination desired.

Therefore, it is already suggested in the prior art to observe a reference LED instead of an LED used to emit the desired light. DE-U-20 2007 005 003 discloses such a light which can be used as an aircraft safety light as used on e.g. tall building structures. In this known light, a photo sensor is associated to the reference LED which emits its light to the photo sensor only and which is shielded or shut off otherwise. However, such an operation of a reference LED cannot represent the operational and environmental conditions which the primary or main LEDs of the light are subjected to throughout their lifetime.

WO-A-2010/139059 discloses a light emitting device comprising a light emitting reference unit which is monitored so as to detect variations in the output of the reference unit arising from changes in temperature or other environmental conditions. The light emitting device is controlled so as to compensate for the output variation of the reference unit detected.

Moreover, from US-A-2008/0238343 a system and method for dimming at least one light source is known while in WO-A-2010/036789 methods and systems for maintaining the illumination intensity of LEDs are described.

Accordingly, there is a need in the prior art for improving the simulation of the operational and environmental conditions of the LEDs of an aircraft light.

SUMMARY OF THE INVENTION

The present invention provides a method for controlling an aircraft light so as to emit a desired light intensity, wherein the aircraft light comprises a plurality of LEDs and wherein each of the LEDs is subjected to thermal stress due to at least one of environmental conditions and operational conditions, at least one of the LEDs or at least one group of the LEDs being subjected to a maximum thermal stress, the method comprising the steps of providing a reference LED located within or outside of the aircraft light, providing thermal conditions resulting in a thermal stress for the reference LED similar to the maximum thermal stress, observing the reference LED by means of an optical sensor for monitoring the optical aging behavior of the reference LED throughout its lifetime, and, for emitting a desired light intensity by the aircraft light, controlling the plurality of LEDs of the aircraft light in accordance with the monitored aging behavior of the reference LED.

According to the invention, in an aircraft light, at least one LED of the plurality of LEDs or at least one group of the plurality of LEDs is identified, which LED or which at least one group of LEDs is subjected to a maximum thermal stress due to environmental or operational conditions. Typically, such an LED or such a group of LEDs is located farthest away from a cooling element typically provided in an aircraft light. However, also special geometric conditions and constructional elements of the aircraft light can result in the LED located within such a region of the aircraft light being subjected to a maximum thermal stress. Accordingly, there might be several reasons why at least one of the plurality of LEDs or one group of the plurality of LEDs is subjected to maximum thermal stress as compared to the other LEDs of the aircraft light.

The idea of the invention is to simulate thermal conditions which a reference LED is subjected to, wherein the simulated thermal conditions result in a thermal stress for the reference LED, which thermal stress is similar and in the ideal case identical to the maximum thermal stress. For example, the reference LED may be operated using the same operational parameters as those used for the maximum thermal stress LED. Also the environmental local temperature of the reference LED could be manipulated so as to be similar and in the ideal case identical to the environmental temperature acting on that LED which is exposed to maximum thermal stress. This makes it possible to control the LEDs so as to compensate for any aging effects detected based on the behavior of the reference LED. For example, the electric current can be increased throughout the lifetime of the LEDs in order to maintain more or less the same emitted light intensity.

In a further step according to the method of the present invention, the reference LED is observed by means of an optical sensor for monitoring the optical aging degradation behavior of the reference LED throughout its lifetime. For example, the optical sensor can be a photo sensor sensing the intensity of light emitted by the reference LED when operated. Generally, the optical sensor should be sensitive within a wavelength range which is more or less identical to or at least encompasses the wavelength range of the light emitted by the aircraft light with the given desired light intensity.

According to the invention, the degradation behavior, in particular due to aging, of the LED having the maximum thermal stress is mapped to the reference LED. Therefore, according to the invention, the aircraft light is controlled taking into consideration the degradation of the reference LED and, accordingly, compensating for it. This compensation method is performed according to the invention without observing or monitoring the LEDs used for emitting the desired light intensity (and light distribution) but by means of an additional LED, namely the reference LED which as such is not used for contributing to the desired light intensity (and light distribution) of the aircraft light.

In one aspect of the present invention, the step of providing thermal conditions for the reference LED comprises the step of thermally shielding the reference LED against its surrounding region or comprises the step of actively heating the reference LED by means of a controllable heating element. Also providing thermal conditions for the reference LED may comprise operating the LED in a manner similar or identical to the maximum thermal stress LED. The step of thermally shielding the reference LED against its surrounding region may comprise providing a cap or the like shielding around the reference LED maintaining an optical connection to the optical sensor. Also thermal decoupling of the reference LED from its environment can be used to thermally shield the reference LED.

In another aspect of the present invention, the step of actively heating the reference LED comprises the step of providing a thermal sensor and sensing the temperature which the at least one LED or the at least one group of LEDs exposed to maximum thermal stress is subjected to, and controlling the heating element for generating a temperature for the reference LED resulting in a thermal stress for the reference LED similar to the maximum thermal stress.

As mentioned above, the light according to the present invention can be designed as an interior or an exterior aircraft light. Moreover, in a further aspect of the present invention, such an aircraft light can be operated either in a flashing lighting mode or in a continuous lighting mode. Therefore, in case of an exterior aircraft light controlled according to the method of the present invention, the aircraft light can be an anti-collision light or navigation light or a landing, take-off, and/or taxi light, a runway turn-off (RTO) light or some other exterior light for an aircraft.

According to a further embodiment of the present invention, the method also comprises the step of cooling the plurality of LEDs and, if desired, other components of the aircraft light.

In another aspect of the present invention, the method also comprises the step of cooling the reference LED. Especially, the step of cooling the reference LED comprises thermally coupling the reference LED to a cooling element. This cooling element can also be used for cooling the plurality of LEDs of the aircraft light.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawings in which:

FIG. 1 shows an embodiment of an exterior aircraft light for which the method according to the invention can be used, FIG. 2 schematically shows a first approach for indirectly monitoring the aging degradation behavior of the LED subjected to maximum thermal stress, FIG. 3 schematically shows an approach according to the invention for indirectly monitoring the degradation of the LED having maximum thermal stress, and FIG. 4 schematically shows a further approach according to the invention.

DESCRIPTION OF PREFERRED EMBODIMENTS

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows one possible and arbitrary design of an aircraft light 10 in which the present invention can be used. The aircraft light 10 comprises a housing 12 including a holder 14 for carrying a plurality of LEDs 16, 20 for emitting light in accordance to a desired intensity and light distribution. The holder 14 can be provided as a cooling element but can also be thermally connected to (another) cooling element 18. Also in the housing 12, electric circuitry and other electronic components are included which for the sake of simplicity are not shown in FIG. 1. The aircraft light 10 further comprises a transmissive cover lens 18. Once again, the specific design of an aircraft light 10 for which the invention can be used is not decisive. What is important is the use of LEDs for emitting the desired light.

Upon operation of the aircraft light 10, the LEDs 16 are subjected to thermal stress resulting from the environmental temperature and other conditions which the aircraft light 10 is exposed to, and from to the operational conditions and, in particular, the operational temperature of the LEDs 16. Due to the individual design of the LEDs and their arrangement within the aircraft light 10 as well as due to the specific overall design of the aircraft light 10, the LEDs are not subjected to the same thermal conditions. Accordingly, one always can identify at least one LED or at least a group of several LEDs subjected to a maximum thermal stress when compared to the other LEDs 16. In FIG. 1 it is assumed that LED 20 is the LED subjected to maximum thermal stress (referred to as "critical or key LED" in the following). The critical LED 20 is expected to be the one affected to the most significant degradation behavior. The normal design to compensate for degradation of the critical LED 20 would be to place an optical sensor in close vicinity to the critical LED 20 in order to detect the light intensity behavior of the critical LED 20 throughout its lifetime. However, due to limited space or the like, it is not possible at all to place such a monitoring sensor in the vicinity of the critical LED 20 or around the space occupied by the LEDs 16 and 20. Therefore, according to the invention, a reference degradation monitoring unit 22 is provided which at least includes a reference LED 24 and an optical sensor 26 receiving at least a portion of the light emitted by the reference LED 24.

How to use the reference degradation monitoring unit 22 for operating the aircraft light 10 so that it emits always the desired light intensity throughout its lifetime, will be described hereinbelow.

A schematic drawing according to the most obvious approach used in the prior art is shown in FIG. 2. As can be seen in FIG. 2, the LEDs 16 and 20 are arranged on a common support which in this embodiment can be a printed circuit board on which the LEDs 16,20 and electronic components are mounted. Arranged spaced apart from the critical LED 20 having the maximum thermal stress, is the reference degradation monitoring unit 22 comprising the reference LED 24 and the optical sensor 26. Reference numeral 28 shows the thermal flow from the critical LED 20 to the degradation monitoring unit 22. The temperature of the critical LED 20 and the reference LED 24 may differ significantly so that this approach is less optimal.

Therefore, in order to improve the simulation of the same thermal conditions for both the critical LED 20 and the reference LED 24, according to the concept of FIG. 3, a thermal shielding 30 is arranged around the reference LED 24 so as to passively heat up reference LED 24. The thermal shielding 30 can include a cap but also can comprise cut-away areas in the holder 14 or printed circuit board around the reference LED 24 so that there is merely a bottleneck left for mechanically connecting that part of the holder 14 supporting the reference LED 24 and the remaining part of the holder 24. In any case, the thermal shielding 30 must not block the optical link between the reference LED 24 and the optical sensor 26.

According to FIG. 4, the degradation monitoring unit 22 also comprises a thermal sensor 32 as well as a controllable heating element 34. Also, in the vicinity of the critical LED 20, another thermal sensor 36 is arranged. Arranging such a thermal sensor 36 in the vicinity of the critical LED 20 is much easier than placing an optical sensor because, in contrast to an optical sensor, a thermal sensor can be arranged so as to not block the light or part of the light emitted by the critical LED 20 and necessary for obtaining the desired light intensity and light distribution of the aircraft light 10.

By means of the thermal sensor 36, the temperature of the critical LED 20 can be sensed and measured. The heating element 34 of the degradation monitoring unit 22 can be controlled so that the reference LED 24 is subjected to the same temperature as the critical LED 20. Therefore, the temperatures of the critical LED 20 and the reference LED 24 now are the same, also since both LEDs are operated in the same manner throughout their lifetimes, the degradation process and effects of the reference LED 24 are the same as for the critical LED 20.

The main features and characteristics of the present invention can be summarized as follows.

LEDs degrade in a compound fashion over temperature as well as over time. A key issue is that there is quite often in a multiple LED piece of equipment, a specific LED or string of LEDs that define the lifetime of the whole unit, as it is the one that is the most thermally stressed. This LED though can in most cases not be optically monitored as it may be exposed to other sources of light and its flux is essential for the purpose of the unit and cannot be blocked for an additional optical sensor. The next best thing is a reference LED in a remote location, where it can be integrated into the unit—but then the thermal loads are not identical to the lifetime-determining key LED. The key element is to mimic the thermal and electronic conditions of the key LED with the reference LED to nearly identical operational loads to be able to use the reference LED as the control element for the entire unit.

The concept of the invention is that a second, a reference LED, is operating under artificially identical conditions as the LED that is the most stressed and therefore allows accurate monitoring and control of the most stressed LED of the unit defining the useful life of the unit.

The invention can be used to mimic any critical LED in a zone of lower thermal stress. The critical LED has a typical thermal behavior in its environment that can be characterized as a specific temperature difference over the zone where the reference LED is going to be located. An artificial thermal bottleneck is created to generate the same level of temperature as the critical LED is exposed to and both LEDs are operated under the same electrical loads. The reference LED will therefore degrade thermally the same and age the same as the critical LED. That can be achieved by at least two means: The first approach resides in creating a bottleneck in the thermoconductive path of the reference LED, by reducing the thermal path or decreasing the conductivity to the heat sink—e.g. like milling out a bottleneck in the PCB path and avoiding direct contact to the ground.

The second approach resides in measuring the temperature at the critical LED with a thermal sensor or similar element and using a second thermal sensor, such as a resistor, at the reference LED and heating element 34 to locally increase the temperature of the printed circuit board until the measured temperature of the reference LED is identical to the temperature of the critical LED.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. Method for controlling an aircraft light (10) so as to emit a desired light intensity, wherein the aircraft light (10) comprises a plurality of LEDs (16, 20) and wherein each of the LEDs (16, 20) is subjected to thermal stress due to at least one of environmental conditions and operational conditions, at least one of the LEDs (20) or at least one group of the LEDs (20) being subjected to a maximum thermal stress, the method comprising the steps of providing a reference LED (24) located within or outside of the aircraft light (10), providing thermal conditions resulting in a thermal stress for the reference LED (24) similar to the maximum thermal stress, wherein said thermal conditions are a simulation of the thermal conditions of the at least one LED (20) or the at least one group of LEDs (20) being subjected to the maximum thermal stress, observing the reference LED (24) by means of an optical sensor (26) for monitoring the optical aging behavior of the reference LED (24) throughout its lifetime, and for emitting a desired light intensity by the aircraft light (10), controlling the plurality of LEDs (16, 20) of the aircraft light (10) in accordance with the monitored aging behavior of the reference LED (24).

2. The method according to claim 1, wherein the step of providing thermal conditions for the reference LED (24) comprises the step of thermally shielding the reference LED (24) against its surrounding region.

3. The method according to claim 1, wherein the step of providing thermal conditions for the reference LED (24) comprises the step of actively heating the reference LED (24) by means of a controllable heating element (34).

4. The method according to claim 3, further comprising the steps of providing a thermal sensor (36) and sensing the temperature which the at least one LED (20) or the at least one group of LEDs (20) exposed to maximum thermal stress is subjected to, and controlling the heating element (34) for creating a temperature for the reference LED (24) resulting in a thermal stress for the reference LED (24) similar to the maximum thermal stress.

5. The method according to claim 3, wherein the temperature of the reference LED (24) is sensed by a thermal sensor (32).

6. The method according to claim 1, wherein the aircraft light (10) is operated either in a flashing lighting mode or in a continuous lighting mode.

7. The method according to claim 1, further comprising the step of cooling the plurality of LEDs (16,20) and, if desired, other components of the aircraft light (10).

8. The method according to claim 1, further comprising the step of cooling the reference LED (24).

9. The method according to claim 8, wherein the step of cooling the reference LED (24) comprises thermally coupling the reference LED (24) to a cooling element (16).

* * * * *